United States Patent
Fu et al.

(10) Patent No.: US 8,259,828 B2
(45) Date of Patent: Sep. 4, 2012

(54) SUB-CARRIER ALIGNMENT MECHANISM FOR OFDM MULTI-CARRIER SYSTEMS

(75) Inventors: I-Kang Fu, Dashe Township, Kaohsiung County (TW); Pei-Kai Liao, Mingjian Township, Nantou County (TW)

(73) Assignee: MediaTek Inc., Hsinchu (TW)

( * ) Notice: Subject to any disclaimer, the term of this patent is extended or adjusted under 35 U.S.C. 154(b) by 726 days.

(21) Appl. No.: 12/369,563

(22) Filed: Feb. 11, 2009

(65) Prior Publication Data

US 2009/0202010 A1 Aug. 13, 2009

Related U.S. Application Data

(60) Provisional application No. 61/027,838, filed on Feb. 12, 2008.

(51) Int. Cl.
*H04K 1/10* (2006.01)

(52) U.S. Cl. .................................. 375/260; 370/208

(58) Field of Classification Search ............ 370/203, 370/208, 338; 375/260, 299; 455/192.2, 455/258

See application file for complete search history.

(56) References Cited

U.S. PATENT DOCUMENTS

| | | | |
|---|---|---|---|
| 7,046,617 B2 | 5/2006 | Rotstein et al. | |
| 7,221,917 B2 | 5/2007 | Kroeger | |
| 2003/0045259 A1 | 3/2003 | Kimata | |
| 2004/0125880 A1 | 7/2004 | Emami et al. | |
| 2004/0228270 A1 | 11/2004 | Chen et al. | |
| 2004/0246994 A1 | 12/2004 | Munoz et al. | |
| 2006/0018249 A1* | 1/2006 | Shearer et al. | 370/208 |
| 2006/0227812 A1 | 10/2006 | Vrcelj et al. | |
| 2006/0239368 A1* | 10/2006 | Hwang et al. | 375/260 |
| 2006/0250940 A1 | 11/2006 | Tirkkonen et al. | |
| 2007/0076583 A1* | 4/2007 | Hadad | 370/203 |
| 2007/0091984 A1 | 4/2007 | Batra et al. | |
| 2007/0140366 A1* | 6/2007 | Rore | 375/260 |
| 2007/0286064 A1 | 12/2007 | Yu et al. | |
| 2008/0056183 A1 | 3/2008 | Gorokhov et al. | |
| 2008/0068999 A1 | 3/2008 | Ishii et al. | |
| 2008/0161025 A1* | 7/2008 | Imai | 455/464 |
| 2008/0260004 A1 | 10/2008 | Batra et al. | |

(Continued)

FOREIGN PATENT DOCUMENTS

WO 2007/003133 A1 1/2007

OTHER PUBLICATIONS

Mark Cudak, IEEE 802.16m System Requirements, IEEE 802.16m-07/002r8, Jan. 15, 2009, pp. 1-31.

Qu Hongyun et al., Proposal for IEEE 802.16m OFDMA numerology, IEEE 802.16m-08/08r1, Jan. 22, 2008, pp. 1-6.

(Continued)

*Primary Examiner* — Leon-Viet Nguyen
(74) *Attorney, Agent, or Firm* — Thomas|Kayden

(57) ABSTRACT

A method of aligning sub-carriers of radio signals of two adjacent frequency channels and devices therefor are described. The method comprises aligning a first plurality of sub-carriers of a first radio signal and a second plurality of sub-carriers of a second radio signal within an overlapped frequency region in-between the two adjacent frequency channels by shifting a center frequency of the first radio signal with a frequency offset. The first radio signal and the second radio signal are adapted for transmission over the two adjacent frequency channels and the first frequency channel is one of the two adjacent frequency channels.

46 Claims, 13 Drawing Sheets

U.S. PATENT DOCUMENTS

| | | | |
|---|---|---|---|
| 2008/0298326 A1 | 12/2008 | Pande et al. | |
| 2008/0310484 A1* | 12/2008 | Shattil | 375/146 |
| 2008/0317150 A1* | 12/2008 | Alexander et al. | 375/260 |
| 2009/0060081 A1 | 3/2009 | Zhang et al. | |
| 2009/0161771 A1* | 6/2009 | Schwoerer et al. | 375/260 |
| 2010/0111226 A1 | 5/2010 | Ko et al. | |
| 2010/0159841 A1 | 6/2010 | Barberis et al. | |
| 2010/0246377 A1 | 9/2010 | Zhang et al. | |

OTHER PUBLICATIONS

Framework and overall objectives of the future development of IMT-2000 and systems beyond IMT-2000, Recommendation ITU-R M.1645, pp. 1-24.

WiMAX Forum Technical Working Group (TWG), WiMAX Forum Mobile System Profile Release 1.0 Approved Specification, May 2, 2007, pp. 1-90.

* cited by examiner

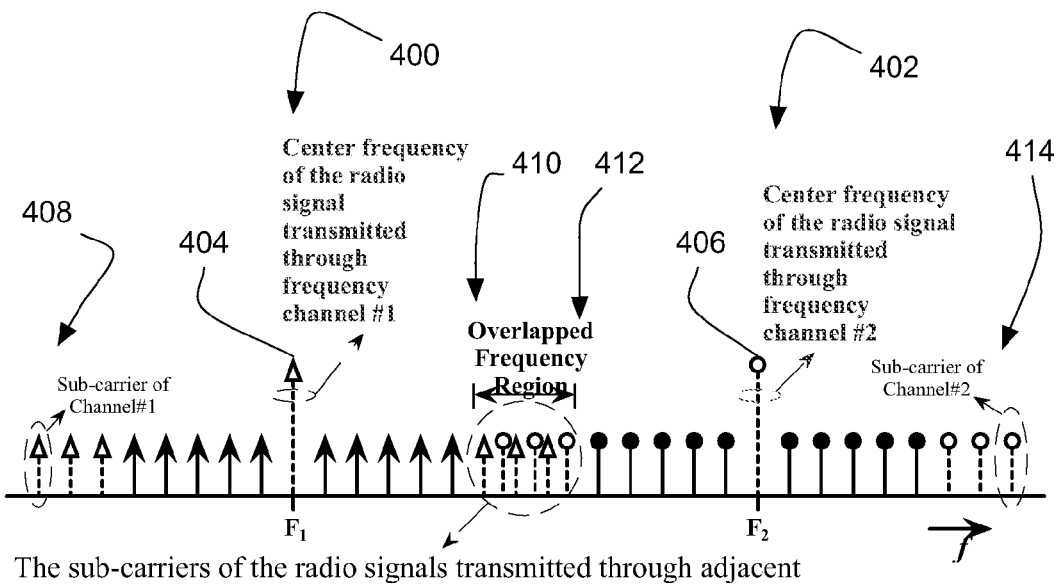
FIG. 4A
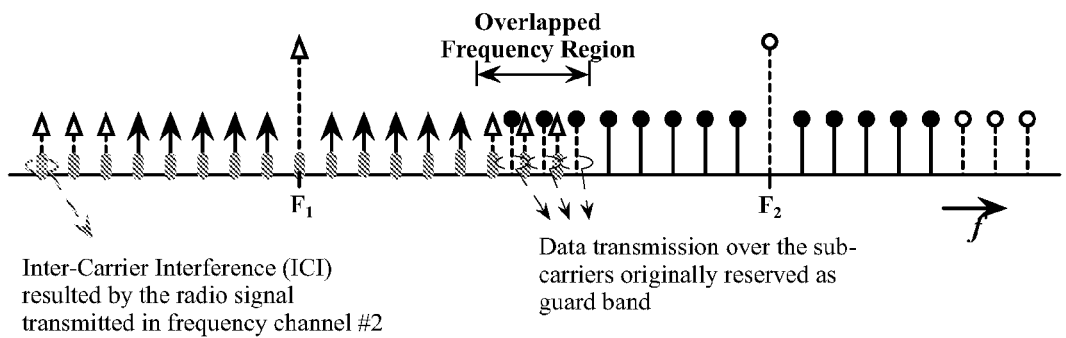
FIG. 4B
FIG. 4

SUB-CARRIER ALIGNMENT MECHANISM FOR OFDM MULTI-CARRIER SYSTEMS

CROSS REFERENCE TO RELATED APPLICATIONS

This application claims priority under 35 U.S.C. §119 from U.S. Provisional Application No. 61/027,838, entitled "A Sub-carrier Alignment Mechanism for Multi-band OFDMA Systems," filed on Feb. 12, 2008, the subject matter of which is incorporated herein by reference.

BACKGROUND

Next generation wireless communication systems will use greater peak transmission rates in comparison to existing wireless communication systems. For example, 4G (fourth generation) mobile communication systems require a 1 Gigabit per second (Gbps) transmission rate. However, to the inventors' knowledge the existing mobile communication systems can only support less than 100 Megabits per second (Mbps) peak transmission rate using 5-10 MHz radio bandwidth.

In order to mitigate the inter-symbol interference (ISI) when supporting very high transmission rate, orthogonal frequency division multiplexing (OFDM) based multiple access (e.g. OFDMA, orthogonal frequency division multiple access) is the baseline transmission technology for the next generation wireless communication systems (e.g., WiMAX 2.0 or LTE-Advanced systems) through the frequency selective propagation channels.

In addition, next generation wireless communication systems may also utilize a much wider radio bandwidth (e.g. >40 MHz) for data transmission so as to achieve much higher peak transmission rate than current systems. Multi-carrier technology enables this functionality by transmitting multiple radio signals on top of different RF carriers to utilize multiple frequency channels across a wider radio bandwidth.

SUMMARY

A method embodiment of aligning sub-carriers of radio signals adapted for transmission over two adjacent frequency channels in a wireless orthogonal frequency division multiplexing (OFDM) system according to the present invention comprises aligning a first plurality of sub-carriers of a first radio signal and a second plurality of sub-carriers of a second radio signal within an overlapped frequency region in-between the two adjacent frequency channels by shifting a center frequency of the first radio signal with a frequency offset. The first radio signal and the second radio signal are adapted for transmission over the two adjacent frequency channels. The first frequency channel is one of the two adjacent frequency channels.

A communication apparatus embodiment for aligning sub-carriers of radio signals adapted for transmission over two adjacent frequency channels in a wireless orthogonal frequency division multiplexing (OFDM) system according to the present invention comprises a frequency synthesizer, a processor, and a memory. The frequency synthesizer is adapted to modify center frequencies of the radio signals. In some other exemplary embodiment, the center frequencies of the radio signals are adjusted by digital signal processor or some baseband processing techniques. The memory comprises a set of instructions which, when executed by the processor, cause the processor to issue a command for shifting a center frequency of a first radio signal in the frequency synthesizer according to a frequency offset for aligning a first plurality of sub-carriers of the first radio signal and a second plurality of sub-carriers of a second radio signal within an overlapped frequency region in-between the two adjacent frequency channels. The first radio signal and the second radio signal are adapted for transmission over the two adjacent frequency channels. The first frequency channel is one of the two adjacent frequency channels.

A communication apparatus embodiment for aligning sub-carriers of radio signals adapted for transmission over two adjacent frequency channels in a wireless orthogonal frequency division multiplexing (OFDM) system according to the present invention comprises a frequency synthesizer, a baseband processing unit. The frequency synthesizer is adapted to modify center frequencies of the radio signals. The baseband processing unit is adapted to align a first plurality of sub-carriers of a first radio signal and a second plurality of sub-carriers of a second radio signal within an overlapped frequency region in-between the two adjacent frequency channels by forwarding a control signal to the frequency synthesizer for shifting a center frequency of the first radio signal in the frequency synthesizer according to a frequency offset. The first radio signal and the second radio signal are adapted for transmission over the two adjacent frequency channels. The first frequency channel is one of the two adjacent frequency channels.

A communication apparatus embodiment for aligning sub-carriers of radio signals adapted for transmission over two adjacent frequency channels in a wireless orthogonal frequency division multiplexing (OFDM) system according to the present invention comprises a frequency synthesizer, a processor, and a memory. The frequency synthesizer is adapted to modify center frequencies of the radio signals. The memory comprises the set of instructions which, when executed by the processor, cause the processor to issue a command for configuring a center frequency of a first radio signal in the frequency synthesizer according to a modified pre-defined center frequency to align a first plurality of sub-carriers of the first radio signal and a second plurality of sub-carriers of a second radio signal within an overlapped frequency region in-between the two adjacent frequency channels. The modified pre-defined center frequency is the sum of a frequency offset and a pre-defined center frequency. The first radio signal and the second radio signal are adapted for transmission over the two adjacent frequency channels. The first frequency channel is one of the two adjacent frequency channels.

A communication device embodiment for communicating frequency offset information for aligning sub-carriers of radio signals of adjacent frequency bands to enable data transmission over overlapping sub-carriers of an orthogonal frequency division multiplexing (OFDM) transmission according to the present invention comprises a processor, an input/output (I/O) interface, and a memory. The memory comprises a set of instructions which, when executed by the processor, cause the processor to determine a frequency offset, as between a first frequency band and a second frequency band, for transmitting a radio signal over a second sub-carrier of the second frequency band which overlaps with a first sub-carrier of the first frequency band, the frequency offset related to the frequency difference between the first frequency band and the second frequency band; and transmit the determined frequency offset to a second communication device via the I/O interface.

DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 4 is a graphical depiction of a portion of spectrum indicating mis-aligned sub-carriers;

DETAILED DESCRIPTION

Figure 1:
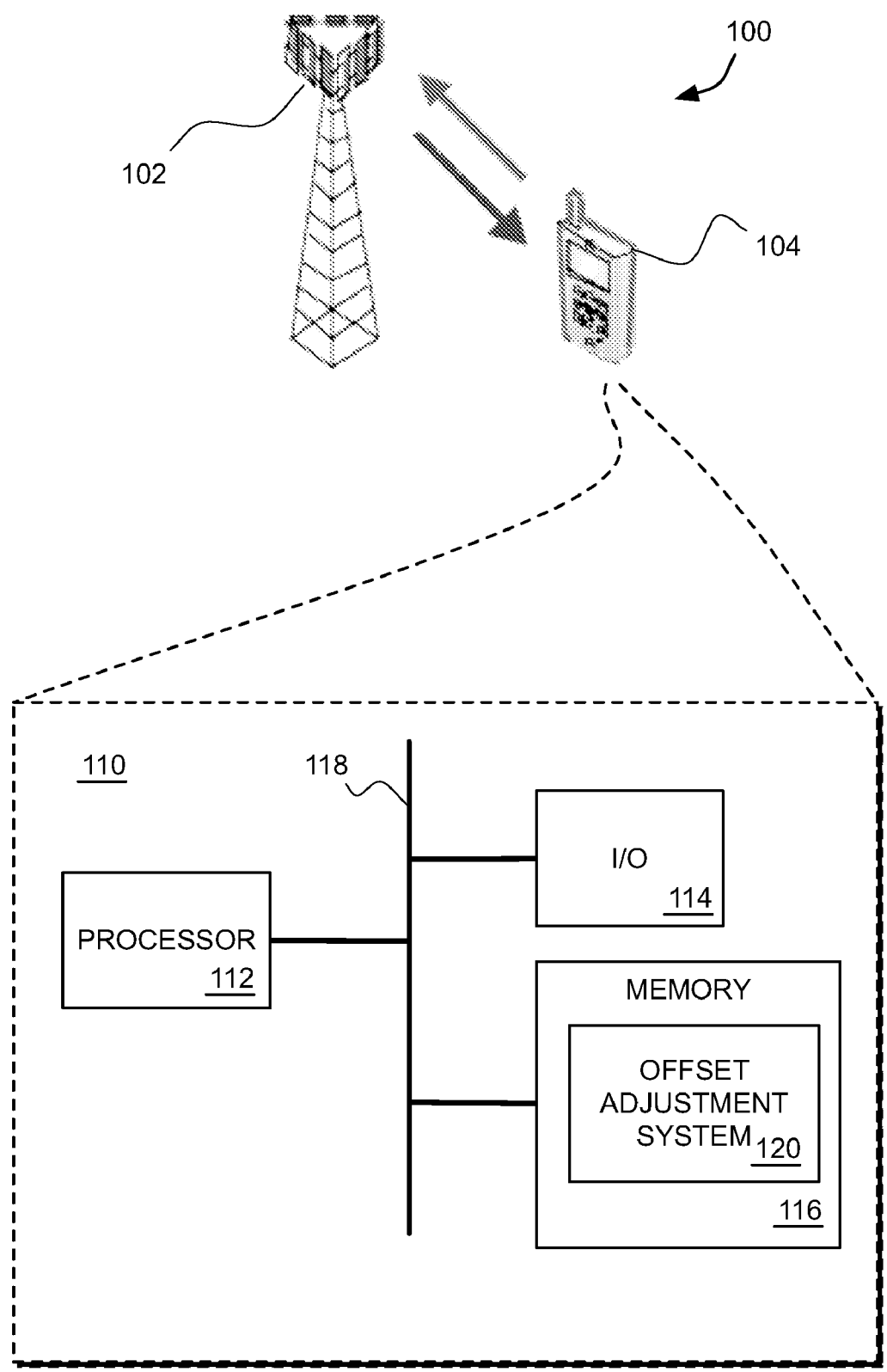
FIG. 1 is a high-level schematic of a communication environment and a high-level functional block diagram of a portion of a communication device according to an embodiment.

FIG. 1 depicts, at an upper portion of the diagram, a high-level schematic of a communication environment 100 in conjunction with which an embodiment according to the present invention may be used to advantage. Communication environment 100 comprises a base station 102, e.g., a wireless or cellular tower, operatively communicatively connected with a mobile device 104, e.g., a wireless or cellular device. In at least some embodiments, base station 102 communicates with mobile device 104 using either a wired and/or a wireless connection. In at least some embodiments, base station 102 communicates with mobile device 104 using an orthogonal frequency division multiplexing (OFDM) transmission scheme, which may combine with FDMA (Frequency Division Multiple Access), TDMA (Time Division Multiple Access), CDMA (CDMA Division Multiple Access) or the mix of aforementioned multiple access techniques to serve multiple mobile devices within the same network. In alternate embodiments, a different transmission scheme may be used.

Although base station 102 is depicted as a tower and mobile device 104 is depicted as a mobile telephone, alternate configurations are contemplated to be within the scope of the present embodiments. Also, in at least some embodiments, roles of transmitter and receiver as between base station 102 and mobile device 104 may be reconfigured.

Figure 2:
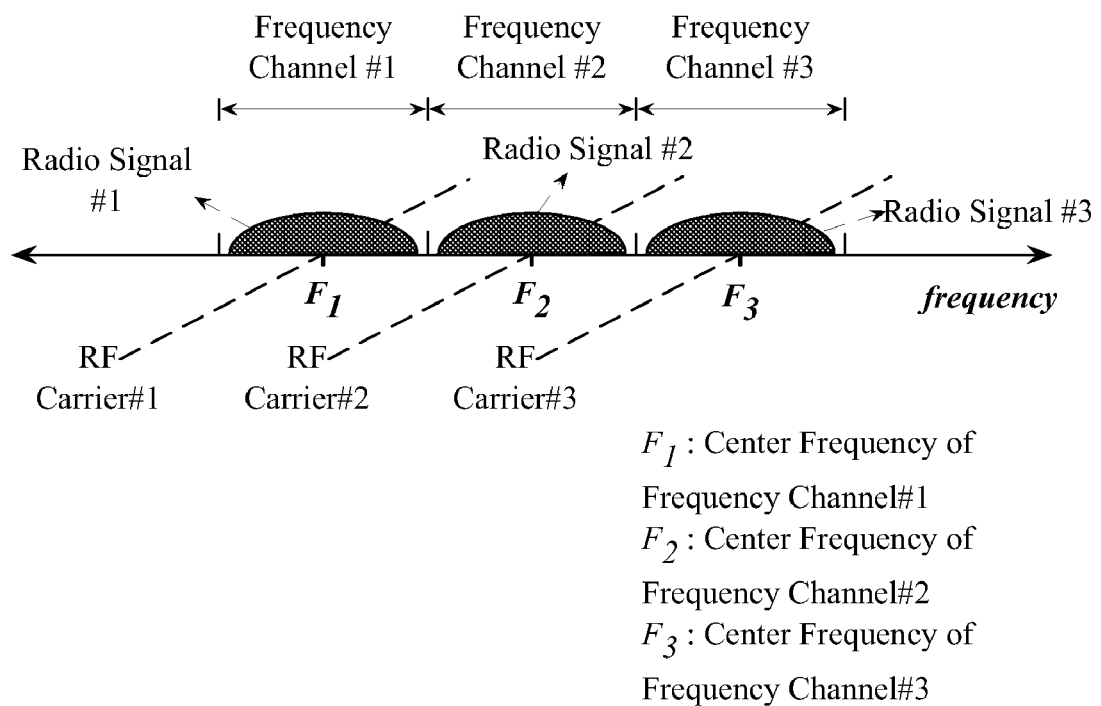
FIG. 2 is a high-level schematic of the multi-carrier technology to transmit multiple radio signals on top of different RF carriers through multiple frequency channels.

FIG. 2 depicts a high-level graph of multiple radio signals transmitted through different frequency channels in OFDMA multi-carrier systems. In OFDM multi-carrier systems, the transmitter and receiver process multiple radio frequency (RF) carriers which carry the radio signals over different frequency channels at the same time. The radio signal is a waveform generated by the transmitter base on OFDMA or OFDM-based multiple access technologies. The frequency location of each RF carrier is the center frequency of the radio signal transmitted through each frequency channel, which is configured by the transmitter and the receiver during transmission and reception of the radio signals.

Figure 3:
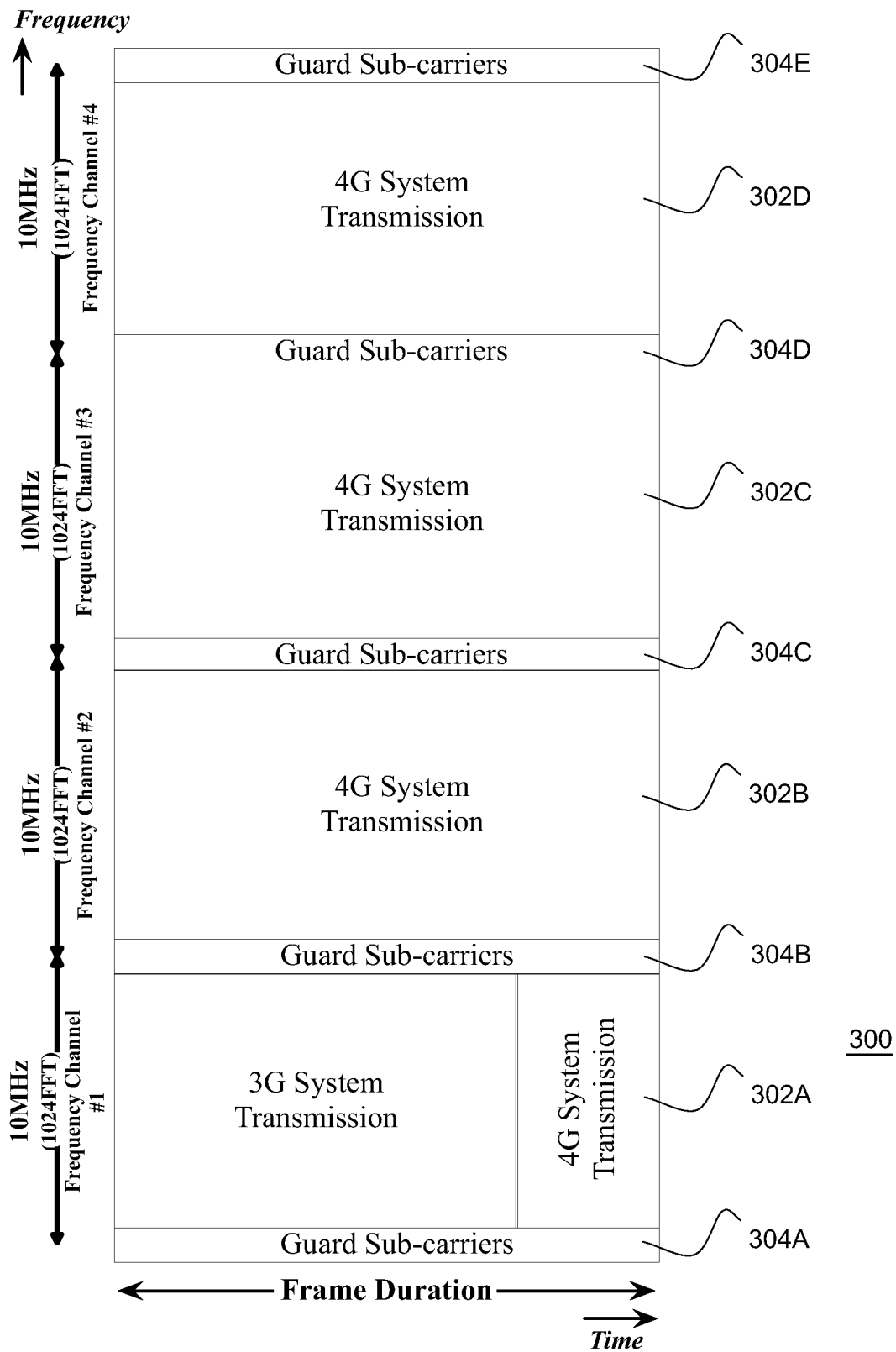
FIG. 3 is a high-level graph depicting guard sub-carriers according to an embodiment.

FIG. 3 depicts a high-level graph 300 of a series of adjacent frequency channels 302A-D each having guard sub-carriers 304A-E at either end of the frequency channels. The vertical axis of graph 300 extends in the frequency domain while the horizontal axis represents time. In particular, guard sub-carriers 304B-D comprise a portion of guard sub-carriers of the frequency channels adjacent to the guard sub-carrier, e.g., guard sub-carrier 304B comprises at least a portion of a guard sub-carrier of frequency channel 302A and at least a portion of a guard sub-carrier of frequency channel 302B. Frequency bands 302A-D comprise regions in which data is transmitted in accordance with the OFDMA transmission scheme. In accordance with at least one embodiment according to the present invention, as described herein guard sub-carriers 304B-D are also usable to transmit data. In at least some embodiments, the spacing of the guard sub-carriers of the frequency channels is substantially the same.

FIGS. 4A and 4B depict a portion of communication spectrum, e.g., from graph 300, in which the overlapped sub-carriers of the radio signals transmitted through adjacent frequency channels are not aligned. FIG. 4A depicts a first frequency channel 400 and a second adjacent frequency channel 402 each comprising a center frequency 404, 406, respectively. First frequency channel 400 also comprises a pair of guard sub-carriers 408, 410, each at respectively distal ends of first frequency channel 400. Second frequency channel 402 similarly comprises a pair of guard sub-carriers 412, 414, respectively located at distal ends of the second frequency channel. As depicted, guard sub-carriers 412 at least partially overlaps a portion of guard sub-carrier 412.

As a result, as depicted in FIG. 4B, because guard sub-carriers 412 of second frequency channel 402 are not aligned with, i.e., are not orthogonal to, guard sub-carriers 410 and other sub-carriers of first frequency channel 400, inter-carrier interference occurs in the sub-carriers of first frequency channel 400. That is, guard sub-carriers 410 and 412 may not be used to transmit data.

Figure 5:
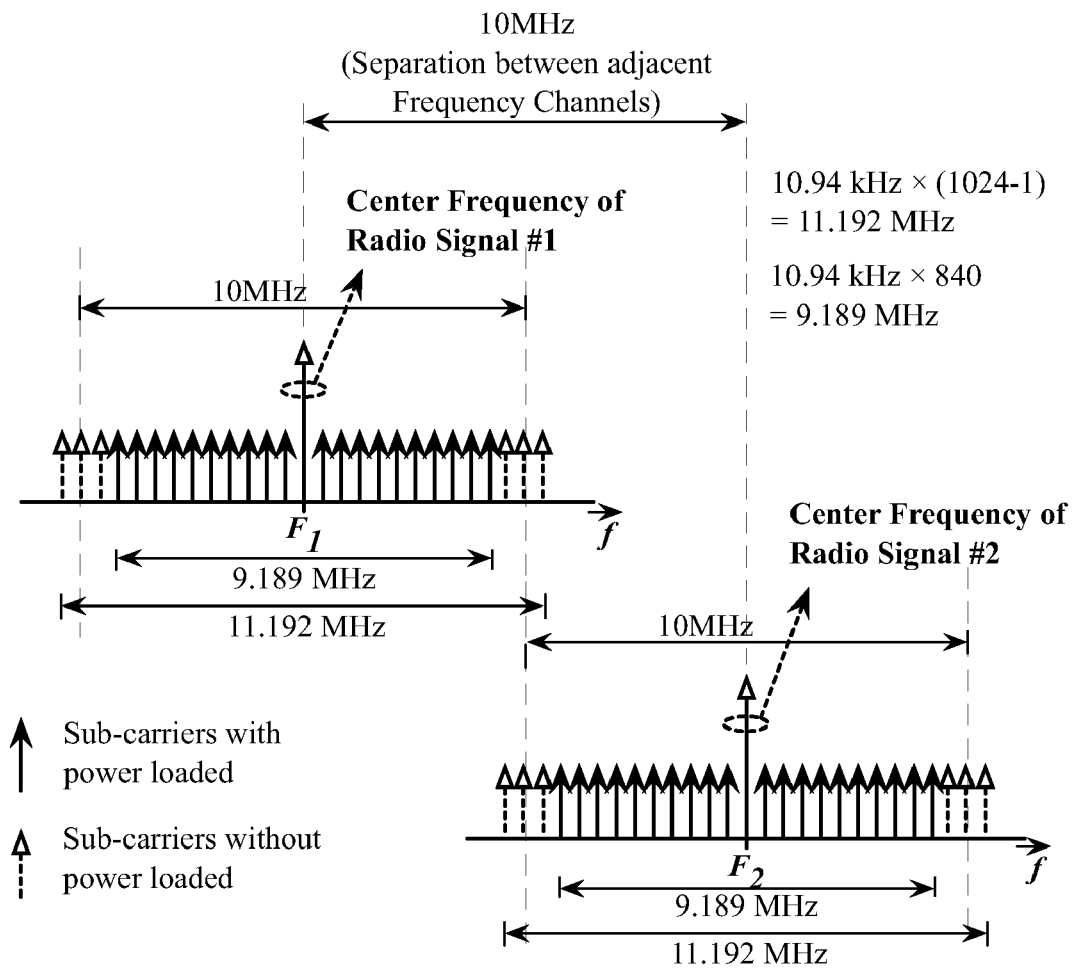
FIG. 5 is a graphical depiction of a portion of spectrum according to an embodiment.

In contrast, FIG. 5 depicts overlapped guard sub-carriers of first and second frequency channels enabling data transmission over the overlapped, aligned guard sub-carriers. That is, the overlapped guard sub-carriers of the first and second frequency channels comprise a frequency domain region distributed with at least a portion of the sub-carriers of the first radio signal and at least a portion of the sub-carriers of the second radio signal. In at least some embodiments, the overlapped frequency region used to transmit data was originally set to be data-transmission prohibited, i.e., the overlapped frequency region was not to be used to transmit data.

Figure 6:
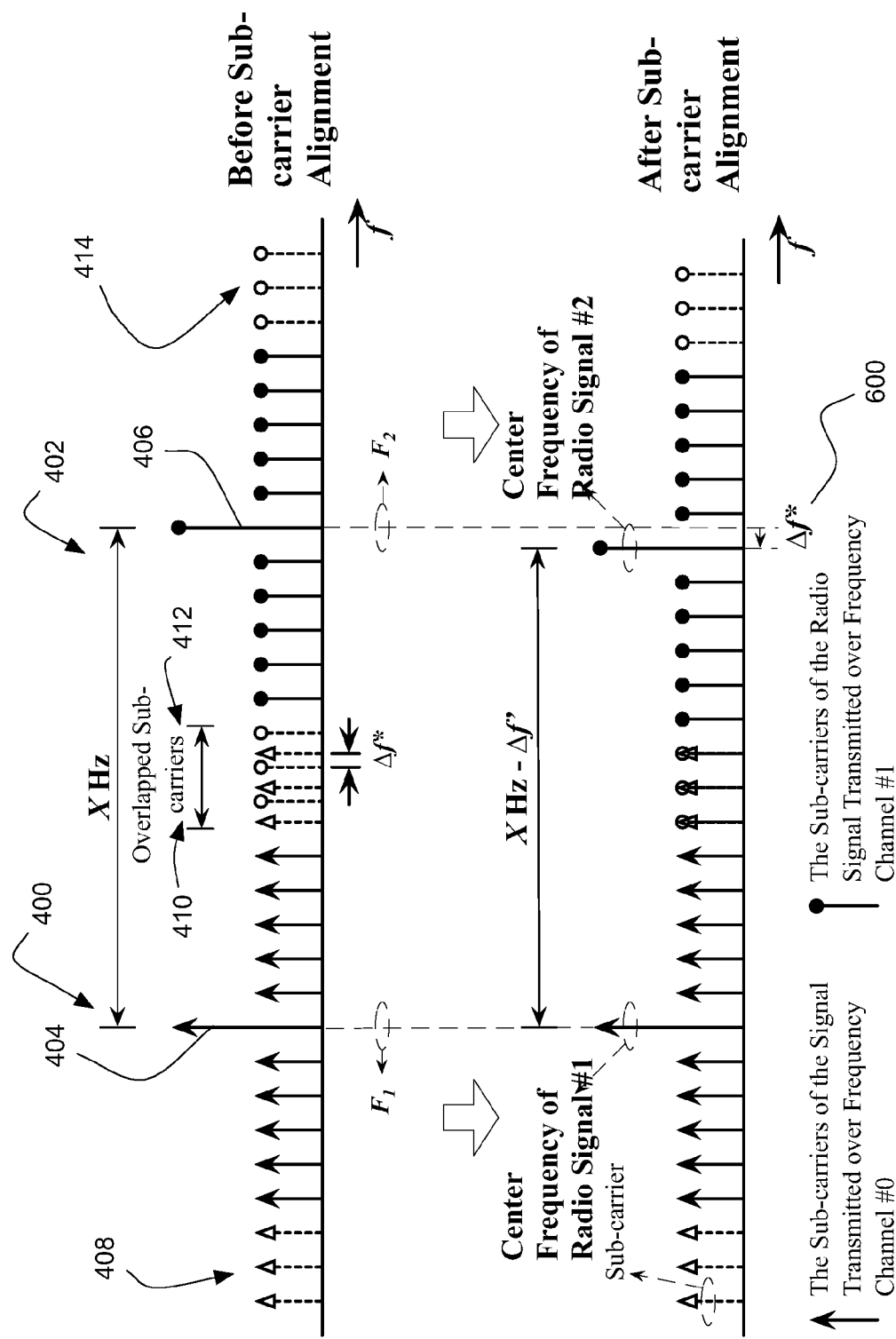
FIG. 6 is a graphical depiction of a portion of spectrum indicating aligned sub-carriers according to an embodiment.

FIG. 6 depicts overlapping adjacent frequency channels according to at least one embodiment. FIG. 6 depicts, at an upper portion, a graphical representation of two frequency channels as depicted in FIG. 4A, i.e., a first frequency channel 400 having two sets of guard sub-carriers 408, 410 at distal ends of the channel and a second frequency channel 402 having two sets of guard sub-carriers 412, 414 at distal ends of the channel, and each frequency channel having a center frequency 404, 406, respectively.

The difference between the overlapping guard sub-carriers 410, 412 is termed the frequency offset 600, i.e., Δf*. Frequency offset 600 is the amount by which the guard sub-carriers of first frequency channel 400 are offset from the guard sub-carriers of second frequency channel 402. As determined by the present inventors, frequency offset 600 also represents the amount by which center frequency 406 of second frequency channel 402 should be adjusted, e.g., shifted, in order that guard sub-carriers 412 overlapping with guard sub-carriers 410 of first frequency channel 400 are aligned. That is, modifying center frequency 406 by an amount equal to frequency offset 600 to generate the new center frequency adapted for radio signal transmission results in guard sub-carriers 412 overlapping in an aligned manner with guard sub-carriers 410 and enabling the transmission of data in the overlapped guard sub-carrier region, i.e., the size of guard sub-carriers 410, 412, or, for example, guard sub-carrier region 304B (FIG. 3).

In at least some embodiments, frequency offset 600 is a fractional value relative to the sub-carrier spacing. In at least some further embodiments, frequency offset 600 is a fractional value relative to the sub-carrier spacing of first frequency channel 400. In at least some other embodiments, frequency offset 600 is a fractional value of first frequency channel 400 sub-carrier spacing and a number of the sub-carrier spacing where the number of the sub-carrier spacing is at least a value of one. In at least some embodiments, frequency offset 600 is a time invariant value.

In at least some embodiments, frequency offset 600 is a minimum frequency difference value ($\Delta f_{min}$) between a sub-carrier of first frequency channel 400 in the overlapped frequency region and a sub-carrier of second frequency channel 402 in the overlapped frequency region. In at least some further embodiments, frequency offset 600 is the minimum frequency difference value plus the number of the spacing of the sub-carriers of first frequency channel 400. In at least some embodiments, frequency offset 600 is the minimum frequency difference value plus the number of the spacing of the sub-carriers of first frequency channel 400 where the number of the spacing is greater than or equal to zero. For example, frequency offset 600 is $N \times \Delta f + \Delta f_{min}$, where N is the number of the spacing. In at least some embodiments, frequency offset 600 is the number of the spacing of the sub-carriers of first frequency channel 400 minus the minimum frequency difference value where the number of the spacing is greater than or equal to one. For example, frequency offset 600 is $M \times \Delta f - \Delta f_{min}$, where M is the number of the spacing.

FIG. 6 depicts, at a lower portion, a graphical representation of first frequency channel 400 and modified second frequency channel 402 where center frequency 406 of the radio signal transmitted through second frequency channel has been adjusted based on frequency offset 600. As a result, the lower portion of FIG. 6 depicts overlapped and aligned guard sub-carriers 410, 412.

Returning to FIG. 1, FIG. 1 depicts, at a lower portion of the diagram, a high-level functional block diagram of a transceiver system 110 usable in conjunction with mobile device 104. In at least some embodiments, transceiver system 110 is usable in conjunction with base station 102.

Transceiver system 110 comprises a processor, baseband processor or controller-based device 112, an input/output (I/O) interface (I/F) 114, e.g., a transmitter and/or receiver device, and a memory 116 each communicatively coupled with a bus 118. Memory 116 (which may also be referred to as a computer-readable medium) is coupled to bus 118 for storing data and information and instructions to be executed by processor 112. Memory 116 also may be used for storing temporary variables or other intermediate information during execution of instructions to be executed by processor 112. Memory 116 may also comprise a read only memory (ROM) or other static storage device coupled to bus 118 for storing static information and instructions for processor 112. Memory 116 may comprise static and/or dynamic devices for storage, e.g., optical, magnetic, and/or electronic media and/or a combination thereof.

I/O I/F 114 may comprise a transmitter, a receiver, and/or a combined transceiver for enabling communication interaction between base station 102 and mobile device 104. In at least some embodiments, I/O I/F 114 comprises a frequency synthesizer arranged to modify center frequencies of radio signals transmitted from transceiver system 110. The frequency synthesizer is responsive to one or more commands received from processor 112 to shift a center frequency of a radio signal. In at least some embodiments, the frequency synthesizer shifts the center frequency by an amount corresponding to frequency offset 600.

Memory 116 comprises an offset adjustment system 120 according to one or more embodiments for determining a frequency offset as between adjacent frequency channels and applying the determined frequency offset to align guard sub-carriers of the adjacent frequency channels to enable transmission of data over at least a portion of the aligned guard sub-carriers.

In at least some embodiments, processor or controller-based device 112 is replaced/supplemented by a baseband processing unit communicatively coupled with the above-described I/O I/F 114, and more particularly, the above-described frequency synthesizer. The baseband processing unit causes the frequency synthesizer to align the guard sub-carriers of first frequency channel 400 with the guard sub-carriers of second frequency channel 402 by forwarding a control signal to the frequency synthesizer causing the frequency synthesizer to shift a center frequency of the first frequency channel by an amount equal to frequency offset 600.

FIGS. 7A-D depict four methods of determining frequency offset 600 according to one or more embodiments with respect to the components of FIG. 1. In at least some embodiments, each of FIG. 7A-D occur after a determination of overlapped and misaligned guard sub-carriers of adjacent frequency channels. In at least some embodiments, frequency offset 600 is applied to each of the frequency channels secondary to the first frequency channel, i.e., frequency channels 302B-D (FIG. 3). In at least some embodiments, frequency offset information and/or frequency offset 600 is transmitted in at least one of a broadcast, multicast, and/or unicast manner.

Figure 7A:
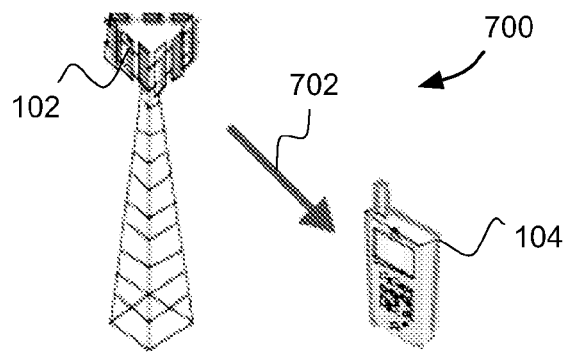
FIGS. 7A-D are high-level schematics of frequency offset determination configurations according to one or more embodiments.

FIG. 7A depicts a reception-only embodiment 700 in which base station 102 transmits frequency offset information (702) to mobile device 104. In at least some embodiments, frequency offset information comprises frequency offset 600 and in at least some alternative embodiments, the frequency offset information comprises a frequency offset indicator specifying at least one of one or more predefined offset values. In at least some embodiments, base station 102 repeatedly multicasts frequency offset information (702) to mobile device 104. In at least some embodiments, base station 102 periodically unicasts frequency offset information to mobile device 104. In at least some embodiments, base station 102 broadcasts frequency offset information to one or more mobile devices 104.

Responsive to receipt of frequency offset information, mobile device 104 applies the frequency offset to the center frequency of the radio signal transmitted through the second frequency channel to cause alignment of the overlapped guard sub-carriers and enable the capability of data transmission using the overlapped guard sub-carriers. In at least some embodiments, even though the overlapped guard sub-carriers are aligned, data transmission may not be performed using the overlapped guard sub-carriers depending on one or more other parameters, e.g., low traffic load.

Figure 7B:
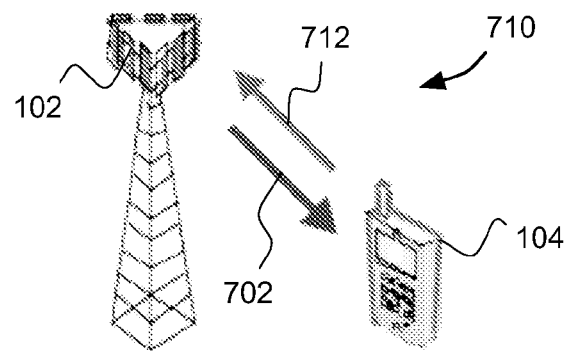

FIG. 7B depicts a receiver reference transmission (also referred to as ranging) embodiment 710 in which mobile station 104, i.e., the receiver of frequency offset information, transmits a reference signal (712) to base station 102. In at least some embodiments, mobile device 104 periodically transmits the reference signal (712) to base station 102. In at least some embodiments, mobile device 104 transmits the reference signal (712) in broadcast manner.

Responsive to receipt of the transmitted reference signal from mobile device 104, base station 102 determines frequency offset 600 and transmits the frequency offset information (702) to mobile device 104 in reply. In at least some embodiments, base station 102 estimates frequency offset 600 based on the received reference signal from mobile device 104. In at least some embodiments, base station 102 repeatedly transmits frequency offset information (702) to mobile device 104. In at least some embodiments, base station 102 periodically transmits frequency offset information to mobile device 104. In at least some embodiments, base station 102 broadcasts frequency offset information to one or more mobile devices 104.

Responsive to receipt of frequency offset 600, mobile device 104 applies the frequency offset to the center frequency of the radio signal transmitted through the second frequency channel to cause alignment of the overlapped guard sub-carriers and enable the capability of data transmission through the overlapped guard sub-carriers.

Figure 7C:
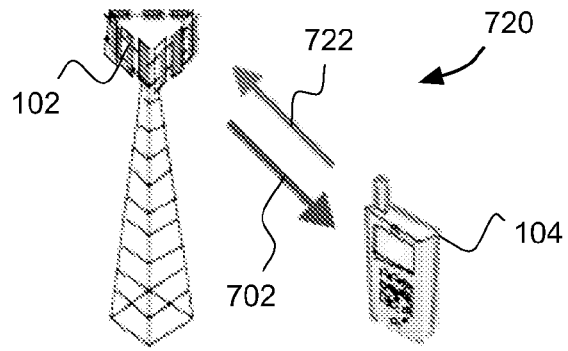

FIG. 7C depicts a receiver request embodiment 720 in which mobile station 104, i.e., the receiver of frequency offset 600, transmits a request for the frequency offset (722) to base station 102. In at least some embodiments, mobile device 104 repeatedly transmits the request for frequency offset 600 (722) to base station 102. In at least some embodiments, mobile device 104 periodically transmits the request for frequency offset 600 to base station 102. In at least some embodiments, mobile device 104 broadcasts the request for frequency offset 600 to at least one base station 102.

Responsive to receipt of the transmitted request for frequency offset 600 from mobile device 104, base station 102 transmits the frequency offset information (702) to mobile device 104 in reply through a first frequency channel. In at least some embodiments, base station 102 repeatedly transmits frequency offset information (702) to mobile device 104. In at least some embodiments, base station 102 periodically transmits frequency offset information to mobile device 104. In at least some embodiments, base station 102 broadcasts frequency offset information to one or more mobile devices 104.

Responsive to receipt of frequency offset information, mobile device 104 applies the frequency offset to the center frequency of the radio signal transmitted through the second frequency channel to cause alignment of the overlapped guard sub-carriers and enable transmission of data using the overlapped guard sub-carriers.

Figure 7D:
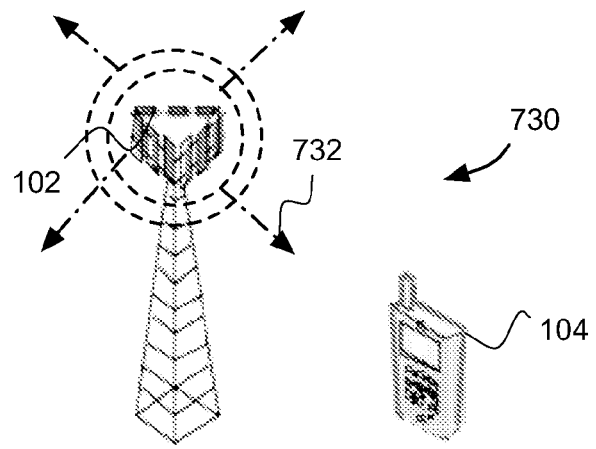

FIG. 7D depicts a broadcast ranging embodiment 730 in which base station 102 transmits one or more reference signals (732) to one or more mobile devices 104.

Responsive to receipt of the transmitted reference signal from base station 102, mobile device 104 determines frequency offset 600. The reference signal is transmitted through the second frequency channel and the guard sub-carriers of the reference signal have already been aligned with the guard sub-carriers of the radio signal transmitted in the first frequency channel. In at least some embodiments, mobile device 104 estimates frequency offset 600 based on the received reference signal from base station 102. In at least some embodiments, base station 102 repeatedly broadcasts the reference signal (732). In at least some embodiments, base station 102 periodically broadcasts the reference signal (732).

Responsive to determination of frequency offset 600, mobile device 104 applies the frequency offset to the center frequency of the radio signal transmitted through the second frequency channel to cause alignment of the overlapped guard sub-carriers and enable transmission of data using the overlapped guard sub-carriers.

In at least some embodiments, the requests for and transmission of frequency offset 600 between base station 102 and mobile device 104 in at least the reception-only and receiver request embodiments occur as part of a media access control layer operation between the base station and the mobile device communication link. In at least some other embodiments, the transmission of (either broadcast or non-broadcast) and/or requests for frequency offset 600 between base station 102 and mobile device 104 occur as part of a media access control layer operation in one or more embodiments.

Figure 8:
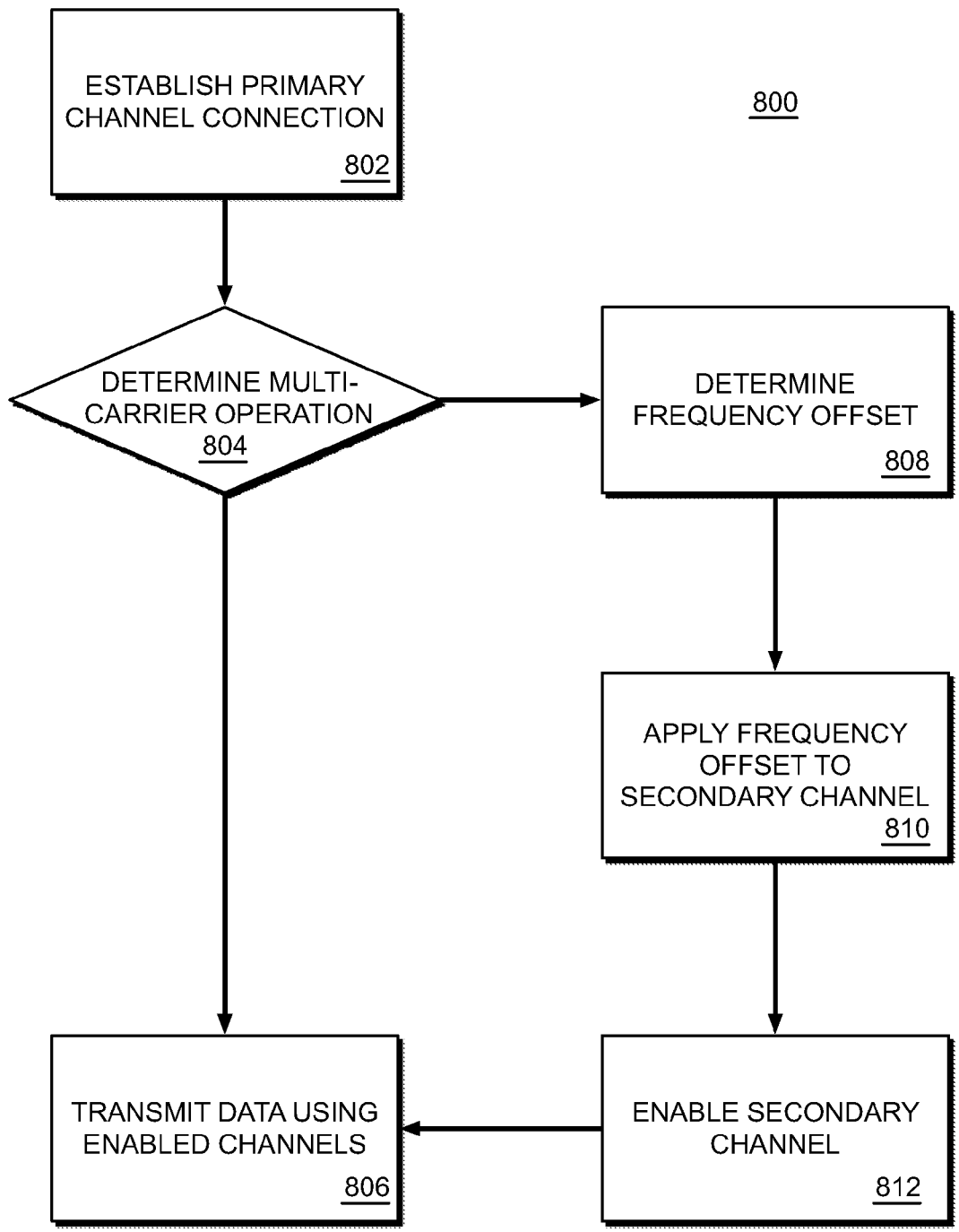
FIG. 8 is a high-level process flow diagram of operation of at least a portion of an offset adjustment system according to one or more embodiments.

FIG. 8 depicts a high-level process flow diagram of operation of at least a portion 800 of offset adjustment system 120 (FIG. 1) according to one or more embodiments. Portion 800 comprises a set of executable instructions, e.g., as stored in memory 116, which when executed by processor 112 cause the processor to perform the operations of the process flow according to one or more embodiments. In at least some embodiments, functionality described in conjunction with portion 800 are executed on mobile device 104. In at least some other embodiments, at least a subset of functionality described in conjunction with portion 800 may be executed on base station 102. In at least some embodiments, the center frequency of the second frequency channel is pre-defined, e.g., prior to transmission, to incorporate frequency offset 600 such that the guard sub-carriers are aligned. The pre-defined center frequency may be stored in memory, e.g., memory 116 of mobile device 104 and/or base station 102. In some exemplary embodiment, the center frequency of the second frequency channel is configured prior to transmission, the modified pre-defined center frequency of the second frequency channel may be stored in the memory, and the modified pre-defined center frequency is sum of the pre-defined center frequency of the second frequency channel and a pre-defined frequency offset, which is 600 in this case. The pre-defined center frequency of the second frequency channel is defined originally in the standard and the modified pre-defined center frequency of the second frequency channel is configured to incorporate the frequency offset of the second frequency channel before the radio signal adapted for transmission. The radio signal transmitting over the second frequency channel is according to the modified pre-defined center frequency. Please note that the frequency offset is generally different for each frequency channel and the frequency offset is generally obtained by evaluating the different frequency channel bandwidths, the separation of adjacent frequency channels, physical-layer parameters like sub-carrier spacing, and other various factors known by person skilled in the art.

The flow of control begins at functionality 802 wherein execution of a set of instructions by processor 112 causes the processor to establish a primary carrier connection with base station 102. During execution of functionality 802, processor 112 causes I/O I/F 114 to communicate with base station 102 to scan for and synchronize with a primary carrier, obtain parameters related to the primary carrier and perform ranging with respect to the primary carrier.

A Primary carrier is the frequency channel used by a base station and a mobile station to exchange traffic and physical layer/media access control layer (PHY/MAC) control information, which is used for control functions for all the basic mobile station operations, such as network entry. In at least some embodiments, each mobile station will have only one primary carrier when communicating with one base station.

Figure 9:
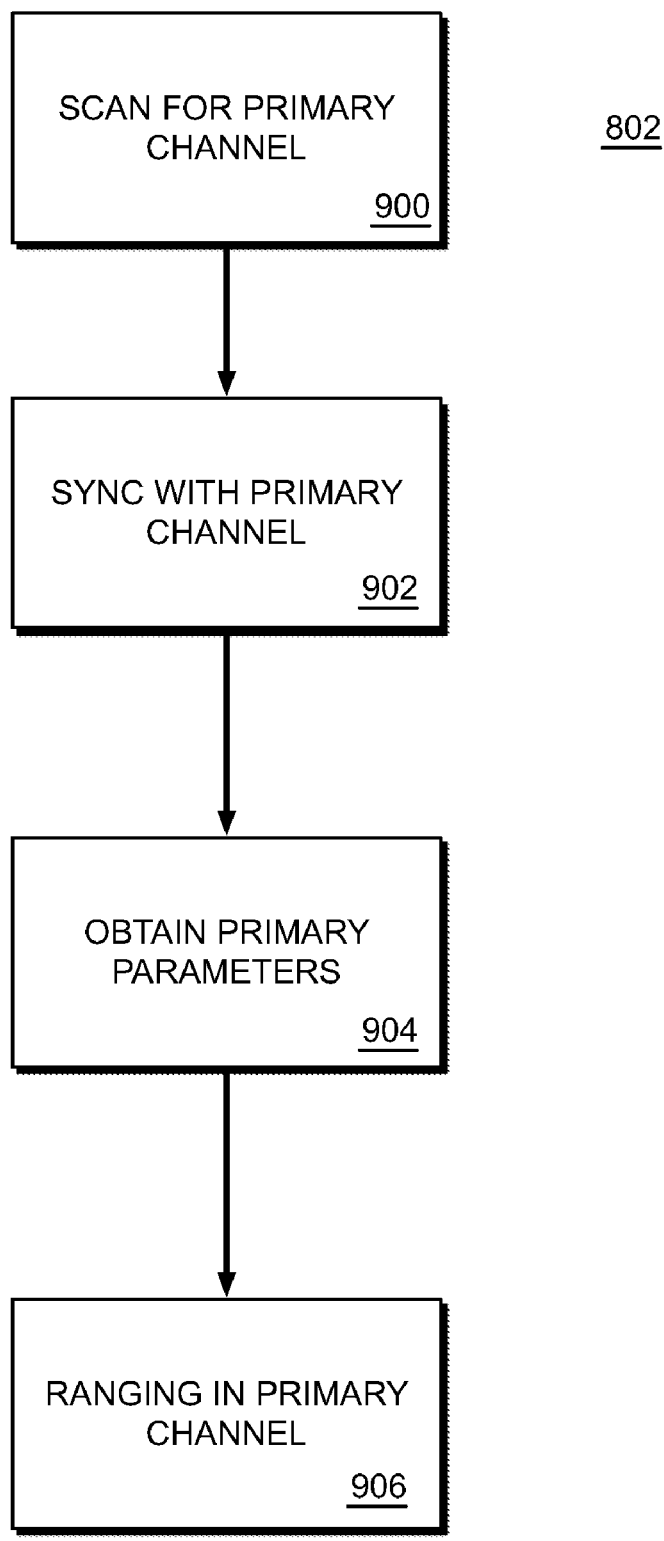
FIG. 9 is a high-level process flow diagram of a detailed portion of an offset adjustment system according to an embodiment.

FIG. 9 depicts a high-level process flow diagram of a detailed portion of functionality 802 (FIG. 8) according to an embodiment. The flow of control begins at scan functionality 900 wherein execution of a set of instructions by processor 112 causes the processor, in conjunction with I/O I/F 114, to scan the received spectrum for a primary carrier on which to communicate with base station 102. After detecting a primary carrier, the flow of control proceeds to sync functionality 902.

During sync functionality 902, execution of a set of instructions by processor 112 causes the processor, in conjunction with I/O I/F 114, to synchronize mobile device 104 with the primary carrier from base station 102. After completion of synchronization, the flow of control proceeds to obtain parameters functionality 904.

During obtain parameters functionality 904, processor 112 obtains parameters related to the primary carrier, i.e., first frequency channel 400. For example, the timing information (e.g. frame boundary, symbol boundary), the frequency information (e.g. the center frequency, the channel bandwidth and the frequency offset need to be applied), the type of frequency channel, the location of Ranging channel and etc.

During ranging functionality 906, processor, in conjunction with I/O I/F 114, determines the center frequency of the primary communication channel for communication. At the completion of ranging functionality 906, a communication connection between mobile device 104 and base station 102 is established using the primary carrier, i.e., first frequency channel 400.

Returning to FIG. 8, after the primary carrier connection is established, the flow of control proceeds to multi-carrier operation determination functionality 804. During multi-carrier operation determination functionality 804, processor 112 determines whether multi-carriers, i.e., more than one frequency channels such as second frequency channel 402, is in operation with respect to base station 102. When the mobile station performs initial network entry with the base station through the primary carrier, the base station and the mobile station exchange capability information with each other. The base station may determine whether the multi-carrier transmission should be enabled based on many considerations (e.g., data rate requirement, traffic load, mobile station hardware capability, etc.)

If the result of functionality 804 determination is negative ("NO"), the flow of control proceeds to transmit data functionality 806 wherein execution of a set of instructions by processor 112 causes the processor to cause I/O I/F 114 to transmit data using enabled communication channels, i.e., using either solely the primary communication channel or the primary carrier in combination with one or more secondary carriers.

A secondary carrier is an additional frequency channel which the mobile station may use for traffic, per the base station's specific allocation commands and rules typically received on the primary carrier. The secondary carrier may also include control signaling to support multi-carrier operation.

On the other hand, if the result of functionality 804 determination is positive ("YES"), the flow of control proceeds to determine frequency offset functionality 808 wherein execution of a set of instructions by processor 112 causes the processor to determine frequency offset 600, i.e., the amount by which the second frequency channel is to be offset in order that the guard sub-carriers of the second frequency band will overlap and align with the guard sub-carriers of the first frequency channel.

After frequency offset 600 is determined, the flow of control proceeds to apply frequency functionality 810 wherein execution of a set of instructions by processor 112 causes the processor to apply the determined frequency offset to the secondary communication channel, i.e., the center frequency of the radio signal transmitted through the second frequency channel 402 is modified by the frequency offset.

FIGS. 10A-D, described below, depict particular detailed embodiments of functionality 808 and 810.

After the determined frequency offset is applied to the center frequency of the radio signal transmitted through the secondary carriers, the flow of control proceeds to enable secondary carrier functionality 812. During execution of a set of instructions comprising enable secondary carrier functionality 812, processor 112 enables the use of secondary carriers, i.e., second frequency channel 402, by mobile device 104 for communication. The flow of control proceeds to transmit data functionality 806 which performs as described above.

FIGS. 10A-10D correspond to the embodiments of FIGS. 7A-D, respectively, with respect to functionalities 808, 810 and depict high-level process flow diagrams.

Figure 10A:
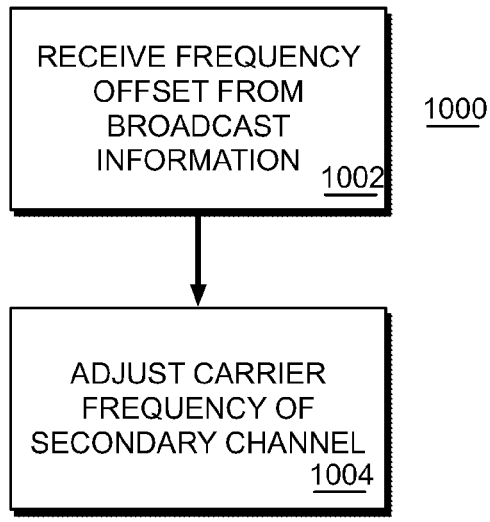
FIGS. 10A-D are high-level process flow diagrams according to one or more embodiments.

FIG. 10A depicts at least a portion of a reception-only embodiment 1000 in which execution of a set of instructions by processor 112 causes mobile device 104 to receive frequency offset 600 from broadcast information (702 of FIG. 7A) from base station 102 in accordance with functionality 1002. That is, mobile device executes functionality 1002 responsive to receipt of broadcast frequency offset information 600. In at least some embodiments, in response to receipt of frequency offset information 600, processor 112 may store the frequency offset to memory 116. After receipt of frequency offset information 600, the flow of control proceeds to functionality 1004.

During execution of functionality 1004, processor 112 causes a modification of second frequency channel 402 by an amount in relation to frequency offset 600. In at least some embodiments, the modification is by an amount equal to frequency offset 600. In at least some alternative embodiments, frequency offset information as described above may be used in place of frequency offset 600.

Figure 10B:
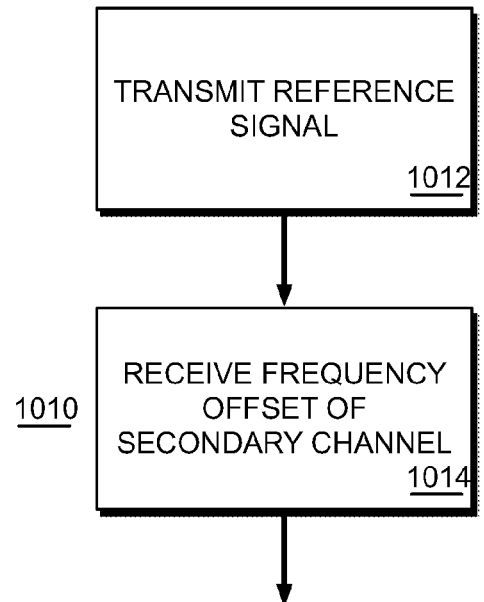

FIG. 10B depicts at least a portion of a receiver reference transmission embodiment 1010 in which execution of a set of instructions by processor 112 causes mobile device 104 to transmit a reference signal (712 of FIG. 7B) to base station 102 in accordance with functionality 1012. In at least some embodiments, mobile device 104 transmits more than one reference signal to base station 102. In at least some embodiments, mobile device 104 transmits the reference signal to base station using a modified center frequency which is modified based on a pre-defined center frequency information. In accordance with at least this specific embodiment, responsive to receipt of the reference signal transmitted using the modified center frequency, base station 102 determines whether and how much additional frequency offset is required to align the sub-carriers based on the modified center frequency and transmits the additional frequency offset to mobile device 104.

The flow of control proceeds to functionality 1014 wherein execution of a set of instructions occurs responsive to receipt of transmitted frequency offset 600 (702 of FIG. 7B) from base station 102 to receive the frequency offset. In accordance with this embodiment, frequency offset 600 is determined by base station 102 based on the transmitted reference signal from mobile device 104. After receipt of frequency offset 600, the flow of control proceeds to functionality 1004.

During execution of functionality 1004, processor 112 causes a modification of second frequency band 402 by an amount in relation to frequency offset 600. In at least some embodiments, the modification is by an amount equal to frequency offset 600. In at least some alternative embodiments, frequency offset information as described above may be used in place of frequency offset 600.

Figure 10C:
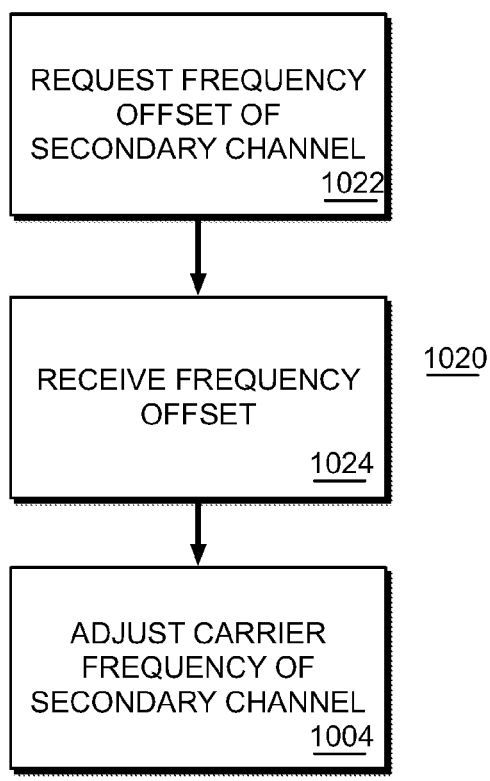

FIG. 10C depicts at least a portion of a receiver request embodiment 1020 in which execution of a set of instructions by processor 112 causes mobile device 104 to transmit a request for frequency offset 600 (722 of FIG. 7C) to base station 102 in accordance with functionality 1022.

After transmission of the frequency offset request, the flow of control proceeds to functionality 1024 wherein execution of a set of instructions occurs responsive to receipt of transmitted frequency offset 600 (702 of FIG. 7B) from base station 102 to receive the frequency offset. In accordance with this embodiment, frequency offset 600 has been previously determined by base station 102. After receipt of frequency offset 600, the flow of control proceeds to functionality 1004.

During execution of functionality 1004, processor 112 causes a modification of the radio signal transmitted through second frequency channel 402 by an amount in relation to frequency offset 600. In at least some embodiments, the modification is by an amount equal to frequency offset 600. In at least some alternative embodiments, frequency offset information as described above may be used in place of frequency offset 600.

Figure 10D:
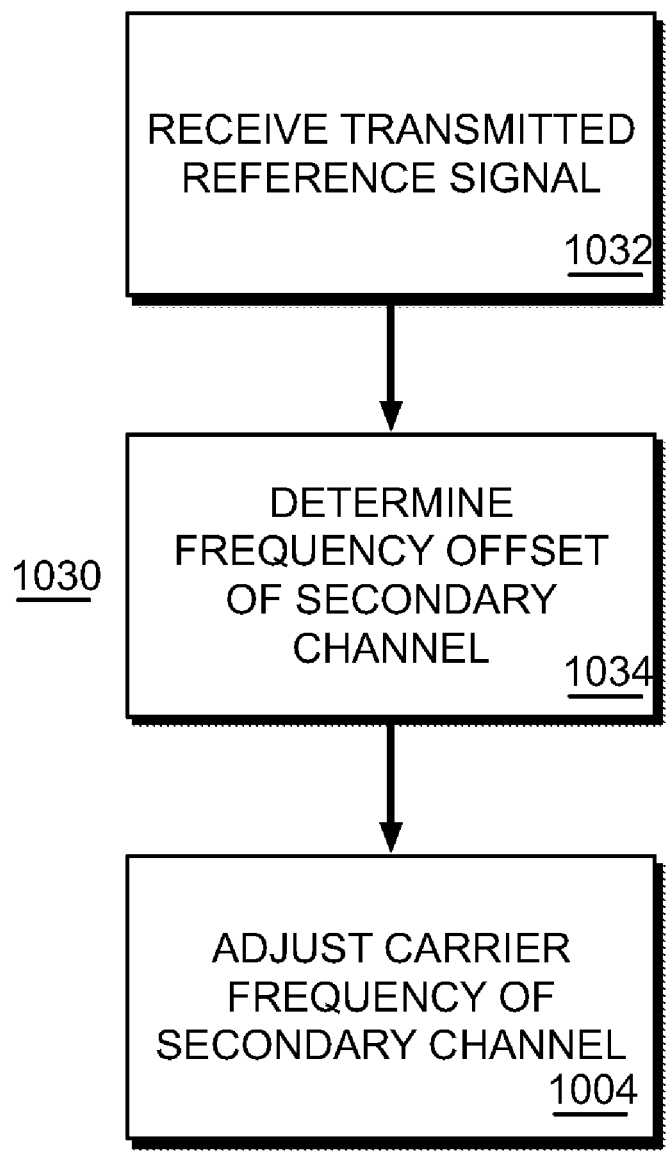

FIG. 10D depicts at least a portion of a broadcast ranging embodiment 1030 in which execution of a set of instructions by processor 112 causes mobile device 104 to receive a transmitted reference signal from base station 102 (732 of FIG. 7D) in accordance with functionality 1032. In at least some embodiments, mobile device 104 receives more than one reference signal from base station 102. The flow of control proceeds to determine frequency offset functionality 1034.

During determine frequency offset functionality 1034, mobile device 104 determines, based on the received transmitted reference signal from base station 102, frequency offset 600. In at least some embodiments, the received transmitted reference signal comprises a modified center frequency such that the sub-carriers of the radio signals transmitted through adjacent frequency channels are aligned, i.e., the reference signal has been modified by an amount in relation to the frequency offset 600 or frequency offset information. In accordance with such an embodiment, mobile device 104 determines the modified center frequency based on the received transmitted reference signal. In at least some such embodiments, mobile device 104 estimates the frequency offset based on the received transmitted reference signal from base station 102 and transmits the estimate, or in some embodiments a modified center frequency-based signal, to the base station. Base station 102 determines, based on the received signal from mobile station 104, whether the mobile device should modify the modified center frequency and transmits the result of the determination to the mobile device. In at least some embodiments, base station 102 transmits the amount of modification to mobile device 104. In at least some embodiments, mobile device 104 is able to determine frequency offset 600 based on the received transmitted reference signal without requiring modification or confirmation from base station 102. In at least some other embodiments, both mobile device 104 and base station 102 store frequency offset information for one or more frequency channels in memory (116 of mobile device 104 and memory of base station 102).

In at least some such embodiments, the stored frequency offset information may comprise frequency offset 600. In at least some other such embodiments, base station 102 and/or mobile device 104 may store modified center frequency information for each of one or more frequency channels which incorporate a given frequency offset value into the original center frequency. In accordance with such an embodiment, frequency offset information or frequency offset 600 need not be transmitted between mobile device 104 and base station 102. In at least some embodiments, mobile station 104 is able to use a set of modified center frequency channels incorporating the frequency offset 600 into the original center frequency. In at least some embodiments, base station 102 may transmit an index or other indicator to mobile device 104 in order to indicate which modified center frequency the mobile device is to use. In accordance with the foregoing, mobile device 104 may use one or more stored pre-defined center frequencies (which incorporate the frequency offset) or the mobile device may modify the center frequency responsive to the received transmitted reference signal from base station 102. In at least some embodiments, in response to determination of frequency offset 600, processor 112 may store the frequency offset to memory 116. After determination of frequency offset 600, the flow of control proceeds to functionality 1004.

During execution of functionality 1004, processor 112 causes a modification of second frequency channel 402 by an amount in relation to frequency offset 600. In at least some embodiments, the modification is by an amount equal to frequency offset 600. In at least some alternative embodiments, frequency offset information as described above may be used in place of frequency offset 600.

Figure 11:
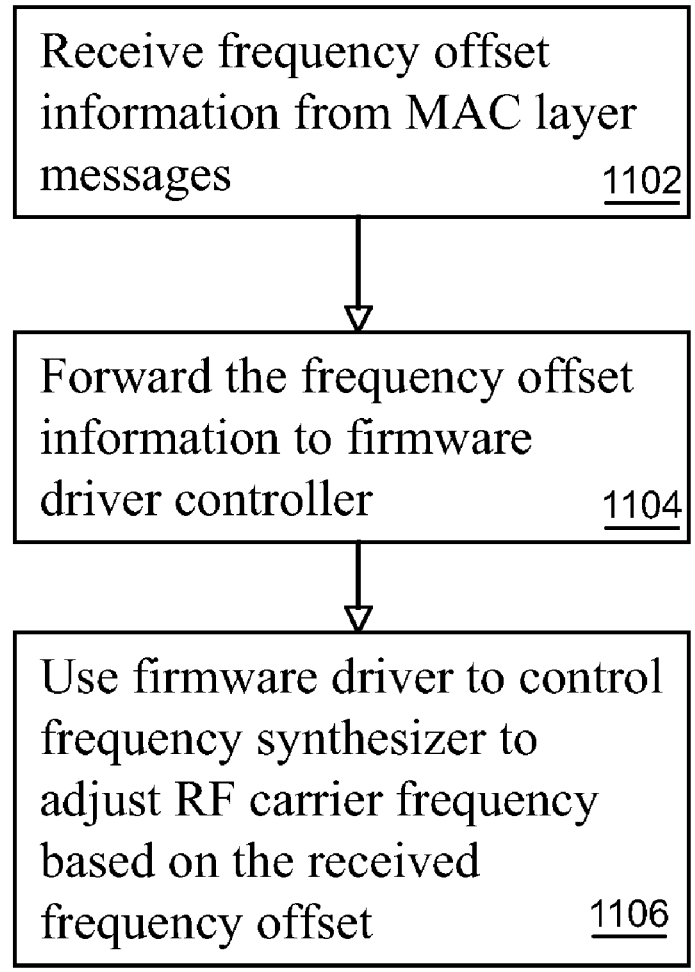
FIG. 11 is a high-level process flow diagram of a detailed portion of adjust carrier frequency functionality according to an embodiment.

FIG. 11 depicts a process flow diagram of at least a portion 1100 of adjust center frequency of secondary carrier functionality 1004 (FIG. 10A-C) in which a set of instructions are executed by processor 112 to cause mobile device 104 to perform the particular functionality. The flow of control begins at functionality 1102 in which mobile device 104, e.g., I/O I/F 114, receives frequency offset 600 from media access control (MAC) layer messages received from base station 102. After receipt of frequency offset 600, the flow of control proceeds to functionality 1104.

During execution of functionality 1104, processor 112 causes frequency offset 600 to be provided to a firmware driver controller of mobile device 104. After frequency offset 600 is provided to the firmware driver controller, processor 112 executing a set of instructions comprising a functionality 1106 causes the firmware driver to control a frequency synthesizer to adjust the carrier frequency of second frequency channel 402 based on the received frequency offset.

Figure 12:
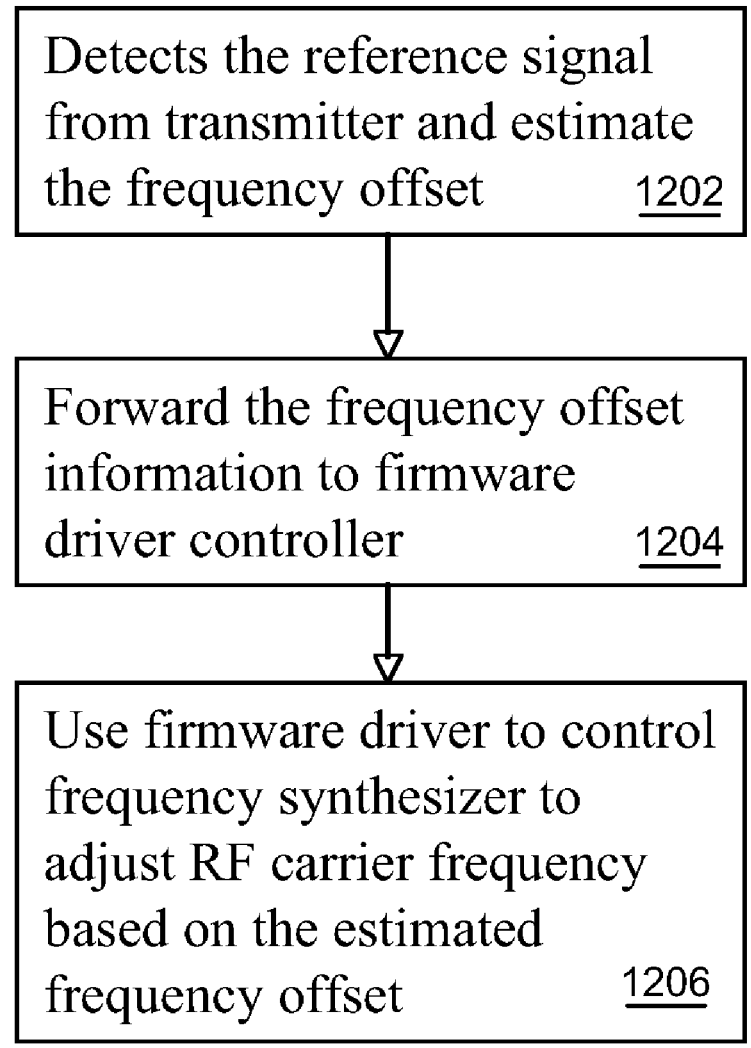
FIG. 12 is a high-level process flow diagram of a detailed portion of adjust carrier frequency functionality according to another embodiment.

FIG. 12 depicts a process flow diagram of at least a portion 1200 of adjust carrier frequency functionality 1004 (FIG. 10D) in which a set of instructions are executed by processor 112 to cause mobile device 104 to perform the particular functionality. The flow of control begins at functionality 1202 in which mobile device 104, e.g., I/O I/F 114, detects a reference signal received from base station 102 and determines frequency offset 600 based on the detected reference signal. In at least some embodiments, mobile device 104 determines frequency offset 600 by estimation based on the detected reference signal. After determination of frequency offset 600, the flow of control proceeds to functionality 1204.

During execution of functionality 1204, processor 112 causes frequency offset 600 to be provided to a firmware driver controller of mobile device 104. After frequency offset 600 is provided to the firmware driver controller, processor 112 executing a set of instructions comprising a functionality 1206 causes the firmware driver to control a frequency synthesizer to adjust the center frequency of the radio signal transmitted through the second frequency channel 402 based on the determined frequency offset.

In at least some embodiments, mobile device 104 may communicate using one or more of the above-described embodiments with another mobile device. Similarly, base station 102 may communicate using one or more of the above-described embodiments with another base station. In at least some embodiments, the transmission of data is meant to include either or both of data and/or voice. In at least some embodiments, aligning the sub-carriers of radio signals adapted for transmission over two adjacent frequency channels operates to mitigate inter-carrier interference. Please note that the communication apparatus in the context may be the base station, mobile station, or network relay station.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A method of aligning sub-carriers of radio signals adapted for transmission over two adjacent frequency channels in a wireless orthogonal frequency division multiplexing (OFDM) system, wherein the method comprises:
    aligning a first plurality of sub-carriers of a first radio signal and a second plurality of sub-carriers of a second radio signal within an overlapped frequency region in-between the two adjacent frequency channels by shifting a center frequency of the first radio signal with a frequency offset, wherein the first radio signal and the second radio signal are adapted for transmission over the two adjacent frequency channels, wherein a first frequency channel is one of the two adjacent frequency channels, and
    wherein the wireless OFDM system process data transmission over multiple radio carriers in different frequency channels at the same time and each frequency channel comprises a pre-defined center frequency,
    wherein shifting the center frequency of the first radio signal is according to a first pre-defined center frequency of the first frequency channel, and
    wherein the shifted center frequency of the first radio signal is different from the first pre-defined center frequency of the first radio signal.

2. The method as claimed in claim 1, further comprising combining OFDM and one or more of FDMA (Frequency Division Multiple Access), TDMA (Time Division Multiple Access), or CDMA (Code Division Multiple Access) to serve multiple devices.

3. The method as claimed in claim 1, wherein the aligning mitigates an inter-carrier interference.

4. The method as claimed in claim 1, wherein the overlapped frequency region is a frequency domain region distributed with at least a portion of the first plurality of sub-carriers of the first radio signal and at least a portion of the second plurality of sub-carriers of the second radio signal.

5. The method as claimed in claim 4, wherein the overlapped frequency region is a guard sub-carriers region originally set to be data-transmission-prohibited.

6. The method as claimed in claim 1, wherein aligning the first plurality of sub-carriers of the first radio signal and the second plurality of sub-carriers of the second radio signal within the overlapped frequency region further comprises shifting a center frequency of the second radio signal transmitted over a second frequency channel in the wireless OFDM system so that the first plurality of sub-carriers and the second plurality of sub-carriers within the overlapped frequency region are aligned, wherein the first frequency channel and the second frequency channel are the two adjacent frequency channels.

7. The method as claimed in claim 1, wherein a first sub-carrier spacing for each of the first plurality subcarriers in the first radio signal is substantially the same as a second sub-carrier spacing for each of the second plurality of sub-carriers in the second radio signal.

8. The method as claimed in claim 7, wherein the frequency offset is a fractional value relative to the first sub-carrier spacing.

9. The method as claimed in claim 7, wherein the frequency offset is according to a fractional value of the first sub-carrier spacing and a number of sub-carrier spacing, wherein the number of the sub-carrier spacing is at least one.

10. The method as claimed in claim 7, wherein the frequency offset is based on a minimum frequency difference value ($\Delta f_{min}$) between a sub-carrier of the first plurality of sub-carriers of the first radio signal in the overlapped frequency region and a sub-carrier of the second plurality sub-carriers of the second radio signal in the overlapped frequency region and the number of a first sub-carrier spacing.

11. The method as claimed in claim 10, wherein the frequency offset is the minimum frequency difference value plus the number of the first sub-carrier spacing, wherein the number of the first sub-carrier spacing is an integer number equal to or greater than zero.

12. The method as claimed in claim 10, wherein the frequency offset is the number of the first sub-carrier spacing minus the minimum frequency difference value ($\Delta f_{min}$), wherein the number of the first sub-carrier spacing is an integer number equal to or greater than one.

13. The method as claimed in claim 1, wherein the frequency offset is based on a minimum frequency difference ($\Delta f_{min}$) between a sub-carrier of the first plurality of sub-carriers of the first radio signal in the overlapped frequency region and a sub-carrier of the second plurality of sub-carriers of the second radio signal in the overlapped frequency region.

14. The method as claimed in claim 1, further comprising:
    receiving a message regarding the frequency offset, wherein the message is transmitted by a transmitter in a broadcasting, multicasting, or unicasting manner.

15. The method as claimed in claim 1, wherein the frequency offset is pre-defined prior to transmission or reception of the radio signals.

16. The method as claimed in claim 1, further comprising:
    receiving a reference signal by a receiver and estimating the frequency offset according to the reference signal, wherein the reference signal comprises a suggested frequency offset.

17. The method as claimed in claim 1, further comprising:
    transmitting an initial reference signal for estimating the frequency offset to a receiver, and;
    receiving the estimated frequency offset from a transmitter.

18. The method as claimed in claim 1, wherein the frequency offset is a time invariant value.

19. The method as claimed in claim 1, further comprising:
    transmitting data over the overlapped frequency region after the first plurality of sub-carriers and the second plurality of sub-carriers are aligned within the overlapped frequency region.

20. A communication apparatus for aligning sub-carriers of radio signals adapted for transmission over two adjacent frequency channels in a wireless orthogonal frequency division multiplexing (OFDM) system, the communication apparatus comprising:
  a processor;
  a memory comprising a set of instructions which, when executed by the processor, cause the processor to issue a command for shifting a center frequency of a first radio signal according to a frequency offset for aligning a first plurality of sub-carriers of the first radio signal and a second plurality of sub-carriers of a second radio signal within an overlapped frequency region in-between the two adjacent frequency channels;
  wherein the first radio signal and the second radio signal are adapted for transmission over the two adjacent frequency channels,
  wherein a first radio signal is adapted to transmitted over a first frequency channel in the wireless OFDM system;
  wherein the first frequency channel is one of the two adjacent frequency channels; and
  wherein the wireless OFDM system process data transmission over multiple radio carriers in different frequency channels at the same time and each frequency channel comprises a pre-defined center frequency,
  wherein shifting the center frequency of the first radio signal is according to a first pre-defined center frequency of the first frequency channel, and
  wherein the shifted center frequency of the first radio signal is different from the first pre-defined center frequency of the first radio signal.

21. The communication apparatus as claimed in claim 20 further comprising a frequency synthesizer adapted to modify center frequencies of the radio signals, wherein the center frequency of the first radio signal transmitted through the first frequency channel is shifted by adjusting the frequency synthesizer.

22. The communication apparatus as claimed in claim 20 further comprising a digital signal processor adapted to configure the center frequencies of the radio signals, wherein the center frequency of the first radio signal is adapted to transmit through the first frequency channel is shifted by configuring the digital signal processor.

23. The communication apparatus as claimed in claim 20, wherein the communication apparatus is adapted to combine OFDM and one or more of FDMA (Frequency Division Multiple Access), TDMA (Time Division Multiple Access), or CDMA (Code Division Multiple Access).

24. The communication apparatus as claimed in claim 20, wherein the overlapped frequency region is a frequency domain region distributed with at least a portion of the first plurality of sub-carriers of the first radio signal and at least a portion of the second plurality of sub-carriers of the second radio signal.

25. The communication apparatus as claimed in claim 22, wherein the overlapped frequency region is a guard sub-carriers region originally set to be data-transmission-prohibited.

26. The communication apparatus as claimed in claim 20, wherein the memory further comprises instructions which, when executed by the processor, cause the processor to issue a command for shifting a center frequency of the second radio signal transmitted over a second frequency channel in the wireless OFDM system so that the first plurality of sub-carriers and the second plurality of sub-carriers within the overlapped frequency region are aligned.

27. The communication apparatus as claimed in claim 20, wherein a first sub-carrier spacing for each of the first plurality subcarriers of the first radio signal is substantially the same as a second sub-carrier spacing for each of the second plurality of sub-carriers of the second radio signal.

28. The communication apparatus as claimed in claim 26, wherein the frequency offset is a fractional value relative to the first sub-carrier spacing.

29. The communication apparatus as claimed in claim 26, wherein the frequency offset is a fractional value of the first sub-carrier spacing and a number of sub-carrier spacing, wherein the number of the sub-carrier spacing is at least one.

30. The communication apparatus as claimed in claim 26, wherein the frequency offset is based on a minimum frequency difference value ($\Delta f_{min}$) between a sub-carrier of the first plurality of sub-carriers of the first radio signal in the overlapped frequency region and a sub-carrier of the second plurality sub-carriers of the second radio signal in the overlapped frequency region and the number of a first sub-carrier spacing.

31. The communication apparatus as claimed in claim 30, wherein the frequency offset is the minimum frequency difference value plus the number of the first sub-carrier spacing, wherein the number of the first sub-carrier spacing is an integer number equal to or greater than zero.

32. The communication apparatus as claimed in claim 31, wherein the frequency offset is the number of the first sub-carrier spacing minus the minimum frequency difference value ($\Delta f_{min}$), wherein the number of the first sub-carrier spacing is an integer number equal to or greater than one.

33. The communication apparatus as claimed in claim 20, wherein the frequency offset is based on a minimum frequency difference ($\Delta f_{min}$) between a sub-carrier of the first plurality of sub-carriers of the first radio signal in the overlapped frequency region and a sub-carrier of the second plurality of sub-carriers of the second radio signal in the overlapped frequency region.

34. The communication apparatus as claimed in claim 20, wherein the frequency offset is pre-defined prior to transmission or reception of the radio signals.

35. The communication apparatus as claimed in claim 20, further comprising instructions which, when executed by the processor, cause the processor to receive a reference signal and estimate the frequency offset according to the reference signal, wherein the reference signal comprises a suggested frequency offset.

36. The communication apparatus as claimed in claim 20, wherein the frequency offset is a time invariant value.

37. A communication apparatus for aligning sub-carriers of radio signals adapted for transmission over two adjacent frequency channels in a wireless orthogonal frequency division multiplexing (OFDM) system, the communication apparatus comprising:
  a baseband processing unit adapted to align a first plurality of sub-carriers of a first radio signal and a second plurality of sub-carriers of a second radio signal within an overlapped frequency region in-between the two adjacent frequency channels by shifting a center frequency of the first radio signal according to a frequency offset according to a control signal,
  wherein the first radio signal and the second radio signal are adapted for transmission over the two adjacent frequency channels,
  wherein the first radio signal is adapted to be transmitted over a first frequency channel in the wireless OFDM system;

wherein the first frequency channel is one of the two adjacent frequency channels; and wherein the wireless OFDM system process data transmission over multiple radio carriers in different frequency channels at the same time and each frequency channel comprises a pre-defined center frequency, wherein shifting the center frequency of the first radio signal is according to a first pre-defined center frequency of the first frequency channel, and wherein the shifted center frequency of the first radio signal is different from the first pre-defined center frequency of the first radio signal.

38. The communication apparatus as claimed in claim 37 wherein the baseband processing unit is adapted to align the first plurality of sub-carriers of a first radio signal and a second plurality of sub-carriers of a second radio signal to mitigate an inter-carrier interference.

39. The communication apparatus as claimed in claim 38 further comprising a frequency synthesizer adapted to modify center frequencies of the radio signals, wherein the center frequency of the first radio signal transmitted through the first frequency channel is shifted by adjusting the frequency synthesizer.

40. The communication apparatus as claimed in claim 38 further comprising a digital signal processor adapted to configure the center frequencies of the radio signals, wherein the center frequency of the first radio signal is adapted to transmit through the first frequency channel is shifted by configuring the digital signal processor.

41. A communication apparatus for aligning sub-carriers of radio signals adapted for transmission over two adjacent frequency channels in a wireless orthogonal frequency division multiplexing (OFDM) system, the communication apparatus comprising:

a processor for processing a set of instructions; and, a memory comprising the set of instructions which, when executed by the processor, cause the processor to issue a command for configuring a center frequency of a first frequency channel according to a modified pre-defined center frequency to align a first plurality of sub-carriers of the first radio signal and a second plurality of sub-carriers of a second radio signal within an overlapped frequency region in-between the two adjacent frequency channels, wherein the modified pre-defined center frequency is the sum of a frequency offset and a pre-defined center frequency of the first frequency channel;

wherein the first radio signal and the second radio signal are adapted for transmission over the two adjacent frequency channels, wherein a first radio signal is adapted to be transmitted over the first frequency channel in the wireless OFDM system and a center frequency of the first radio signal is the same as the modified pre-defined center frequency of the first frequency channel, and;

wherein the first frequency channel is one of the two adjacent frequency channels.

42. The communication apparatus as claimed in claim 41, wherein the memory stores a set of modified pre-defined center frequencies for different frequency channels.

43. The communication apparatus as claimed in claim 42, wherein the communication apparatus is adapted to combine OFDM and one or more of FDMA (Frequency Division Multiple Access), TDMA (Time Division Multiple Access), or CDMA (Code Division Multiple Access).

44. The communication apparatus as claimed in claim 42 further comprising a frequency synthesizer adapted to modify center frequencies of the frequency channel, wherein the center frequency of the first frequency channel is configured in the frequency synthesizer.

45. The communication apparatus as claimed in claim 42, wherein the frequency synthesizer is adapted to align the first plurality of sub-carriers of the first radio signal and the second plurality of sub-carriers of the second radio signal to mitigate inter-carrier interference.

46. The communication apparatus as claimed in claim 42 further comprising a digital signal processor adapted to configure the center frequencies of the radio signals, wherein the center frequency of the first radio signal is adapted to transmit through the first frequency channel is shifted by configuring the digital signal processor.

* * * * *